UNITED STATES PATENT OFFICE.

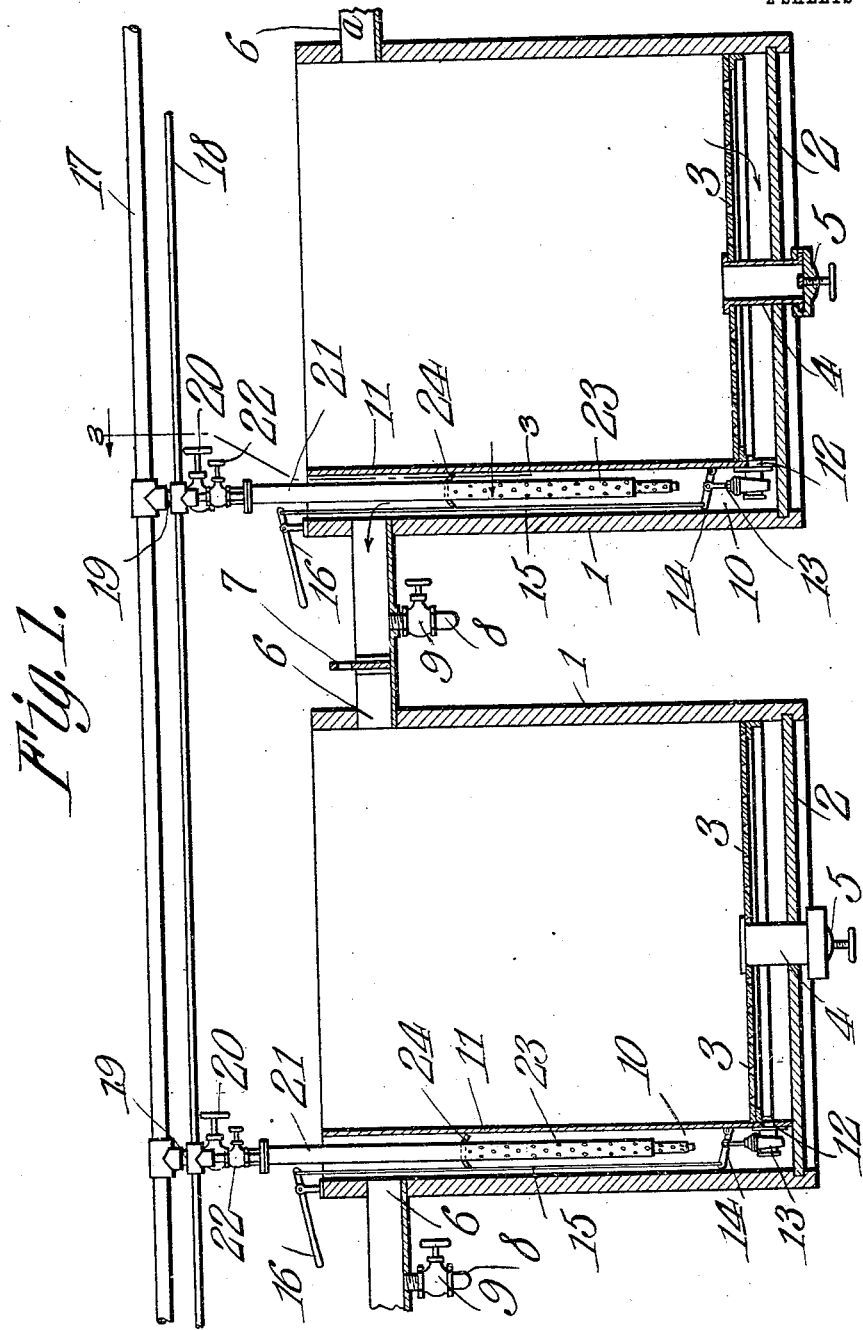

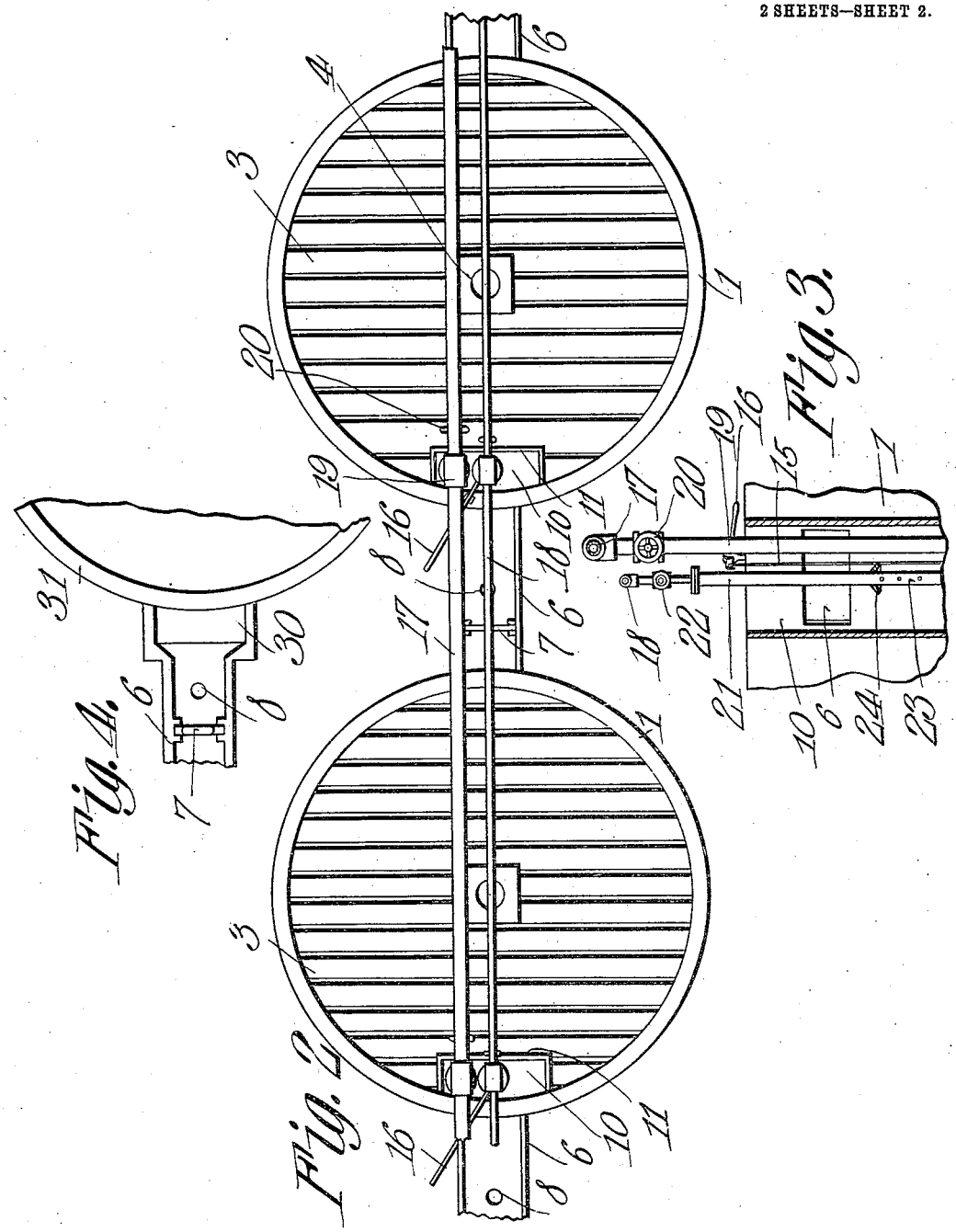

WILLIAM HOLMES TEAS, OF RIDGWAY, PENNSYLVANIA.

LEACHING-VAT.

951,206.  Specification of Letters Patent.  Patented Mar. 8, 1910.

Application filed August 5, 1909. Serial No. 511,425.

*To all whom it may concern:*

Be it known that I, WILLIAM H. TEAS, a citizen of the United States, residing at Ridgway, in the county of Elk and State of Pennsylvania, have invented a new and useful Leaching-Vat, of which the following is a specification.

This invention relates to improvements in leaching apparatus for the preparation of tanning liquors and tanning extracts and consists in certain novel features which will be hereinafter first fully described and then particularly pointed out in the claims.

In leaching barks, woods, leaves or other material so that the resulting decoction may be used as a tanning liquor either directly or after concentration to the extract form, a series of vats is used. The water or liquid, after being put on the first vat in the series, flows or is pumped to the next vat in the series and will be carried successively through all the vats of the system and then transferred to a storage vat. This water or liquor must be heated and maintained at the temperature desired by the operator and my present invention relates more particularly to the means for heating the liquor.

In the accompanying drawings, which fully illustrate my invention, Figure 1 is a vertical longitudinal section of two vats arranged to communicate and provided with my improvements. Fig. 2 is a plan view of the same. Fig. 3 is a detail vertical sectional view, taken on the line 3—3 of Fig. 1. Fig. 4 is a detail plan view showing a slightly modified application of the invention.

The vats 1 may be of any desired size and are provided with a true bottom 2 and also a false bottom 3 composed of slats secured a short distance above the true bottom and having their edges beveled and spaced apart, as clearly shown. Disposed centrally in the vat and extending through both the true and false bottom is an outlet 4 provided with a suitable closure 5 through which the spent material may be withdrawn from the vat. The vats are connected near their upper ends by troughs 6 in which is a slidable cut-off or valve 7 which is disposed transversely in the trough and is slidable vertically in suitable ways provided on the sides of the trough, as will be readily understood. Depending from the bottom of the trough and disposed between the gate or valve 7 and the receiving end of the trough is a discharge pipe 8 provided with a suitable valve 9 by which the liquor may be withdrawn from the trough and transferred to the storage vat when it has reached the desired strength. It will be understood that the valve 9 is closed except when the gate 7 is closed and that the liquor will be either drawn off from the trough to the storage tank or will be permitted to flow through the trough from one vat to the next vat in the series, the direction of flow being indicated by arrows in Fig. 1.

Within each vat at one side of the same is a heating compartment 10, which, in the preferred form, is provided by a partition 11 arranged vertically within the vat and extending to the bottom of the same. An inlet 12 is provided in the lower end of this partition between the true bottom 2 and the false bottom 3, and the flow through the said inlet is controlled by a gate valve 13, the stem of which is pivoted to a lever 14 fulcrumed upon the partition 11 and extending across the valve and having its free end pivotally attached to the lower end of a pitman or connecting rod 15 which extends up through the heating compartment and has its upper end pivoted to an operating lever or handle 16 fulcrumed upon the side of the vat, as will be readily understood.

Disposed above the vats and extending along the entire series are a water main or pipe 17 and a steam main or pipe 18 from which branch pipes depend into the heating compartment 10. The branch water pipe 19 extends downward to near the bottom of the heating compartment and is provided near its upper end with a cut-off valve 20 by which the flow of water or liquor may be controlled, it being understood that the function of this pipe is to furnish the supply of liquor in the leaching operation. The depending branch steam pipe 21 is provided near its upper end with a cut-off valve 22 by which the flow of steam to the heating compartment may be regulated, and the lower portion of the said pipe 21 is provided with a number of perforations 23 through which the steam may escape. This escaping steam will be condensed by the liquor in the heating compartment and will raise the temperature of the same, and in order to prevent loss of the live steam, a hood 24 is secured on the pipe 21 just above the said perforations.

In the accompanying drawings, I have shown only two vats, for the sake of clearness, but it will be understood that any desired number of vats may be employed and that they will be duplicates of the vats illustrated. The water or liquor is admitted to the first vat in the series and will percolate through the material in the vat so as to pass through the false bottom and collect in the space between the same and the true bottom. The valve 13 being open, the liquor will flow into the heating compartment 10 and will rise within the same and overflow into the trough 6. As it rises through the heating compartment, the liquor will mingle with the steam from the pipe 21 and will be thereby raised to the desired temperature so that it will be heated when passing into and through the trough 6. If the valve 9 is closed and the gate or valve 7 is opened, the liquor will flow into the next vat of the series and be delivered upon the material in the said vat and this operation will be repeated until the liquor has attained the desired strength. Should it be desired to draw off the liquor, the gate 7 is closed and the valve 9 is opened whereupon the liquor will flow through the discharge 8 to the storage tank or vat. Should the material in any vat, for instance, the vat shown at the right in Fig. 1, be spent, the valve 13 is closed by means of the lever 16 and its connections so as to prevent further flow through the outlet 12 and an additional supply of water or liquor is admitted to the heating compartment through the branch pipe 19. This water or liquor will be raised in temperature by its contact with the steam from the pipe 21 and will pass into the vat at the left of Fig. 1 through the trough 6, as will be readily understood. The spent material may then be withdrawn from the vat at the right and the said vat cleaned and then again placed in operation after receiving a fresh supply of material.

In Fig. 4 I have shown a slight modification of the invention in which the heating compartment 30 is arranged on the outside of the vat 31 instead of within the vat, and the trough 6 leads directly from the upper end of the heating compartment, as will be readily understood.

My device is simple in its construction, may be very easily manipulated and is efficient in operation.

Having thus described my invention, what I claim is:

1. In a leaching apparatus, the combination of vats, a trough forming a communication between the upper ends of the vats, a cut-off valve disposed transversely in the trough, and a valved discharge pipe leading from the bottom of the trough between the said cut-off valve and the entrance end of the trough.

2. The combination of a vat, a heating compartment arranged on the side of the vat and communicating therewith at the lower end thereof, a liquor main disposed above the vat, a heating main disposed above the vat, and branch pipes leading from the said mains respectively and terminating in the heating compartment.

3. The combination of a vat, a heating compartment at one side of the vat, a liquor main disposed above the vat, a heating main also disposed above the vat, and valved pipes leading from the said mains into the heating compartment, the pipe leading from the said heating main being provided with a condensing hood within the compartment.

4. The combination of a series of vats, a vertically disposed heating compartment on one side of each vat, and communicating with the vat at its lower end only, troughs connecting the upper end of each heating compartment with the succeeding vat, a steam pipe having its end in said compartment, and a liquor supply pipe also having its end in the said compartment.

In testimony that I claim the foregoing as my own, I have hereto affixed my signature in the presence of two witnesses.

WILLIAM HOLMES TEAS.

Witnesses:
R. C. McFARLAND,
J. A. BRIGGEN.